Feb. 26, 1935. C. G. OLSON Re. 19,479
ELECTRICAL CONNECTER
Original Filed Dec. 13, 1929
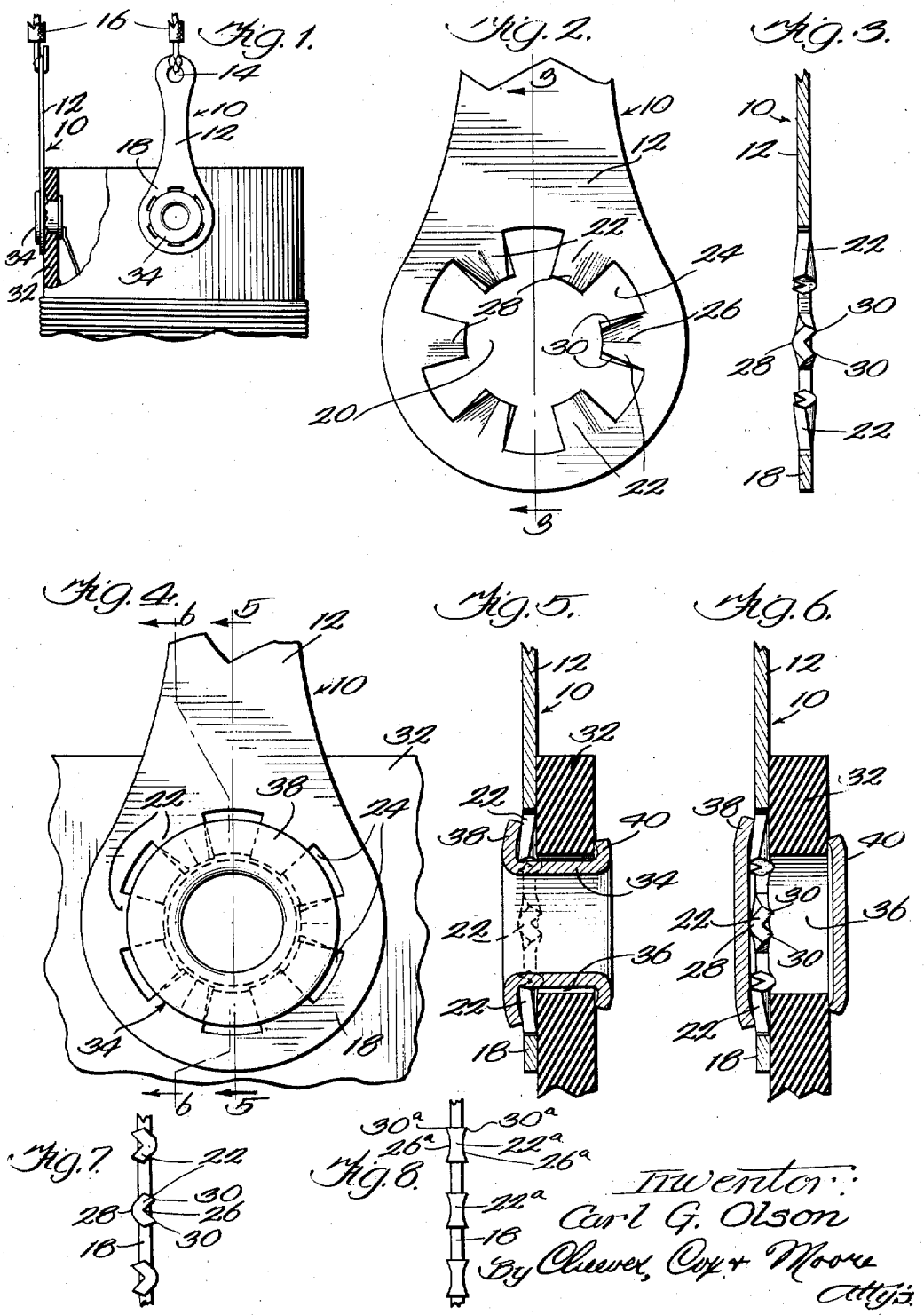

Reissued Feb. 26, 1935

Re. 19,479

UNITED STATES PATENT OFFICE 19,479

ELECTRICAL CONNECTER

Carl G. Olson, Chicago, Ill., assignor, by mesne assignments, to Illinois Tool Works, Chicago, Ill., a corporation of Illinois Original No. 1,874,594, dated August 30, 1932, Serial No. 413,709, December 13, 1929. Application for reissue November 1, 1934, Serial No. 751,065

12 Claims. (Cl. 173—269)

My invention relates generally to improvements in terminal construction and particularly to terminals or connecters for use in connection with impressionable material such as fiber insulating material and the like.

The present invention is related to the invention disclosed in the application of John M. Gribbie, Serial No. 413,739, filed December 13, 1929 and issued August 30, 1932 as Patent No. 1,874,507, in that it relates to terminals or connecters which are particularly adaptable for use in connection with relatively soft or impressionable sheet material such as fibroid and the like commonly employed as an insulating medium. The present invention, however, differs from the invention set forth in the above mentioned application in that it contemplates the provision of a new and decidedly practical tooth construction. It is one of the primary objects of the present invention to provide a tooth construction for a terminal member or connecter which will have increased locking effectiveness and to this end I propose to provide teeth having a concave construction which will present work engaging edges as well as areas into which impressionable material may flow when the terminal is clamped thereagainst.

More specifically my invention contemplates the provision of a terminal member or connecter of flat stock having a plurality of annularly arranged teeth, said teeth being provided with concave or V-shaped recesses for increasing the locking effectiveness of the teeth when the same are clamped against impressionable material.

These and numerous other objects and advantages will be more apparent from the following detailed description when considered in connection with the accompanying drawing, wherein:

Figure 1 is an elevational view shown partly in section of a terminal member or connecter embodying features of my invention, said connecter being shown in operative association with the work;

Figure 2 is an enlarged fragmentary view of a detached connecter similar to the one shown in Figure 1;

Figure 3 is a transverse sectional view taken substantially along the line 3—3 of Figure 2;

Figure 4 is an enlarged fragmentary view of the device as shown in Figure 1;

Figure 5 is a sectional view taken substantially along the line 5—5 of Figure 4;

Figure 6 is a sectional view taken along the line 6—6 of Figure 4 and discloses in elevation the connecter teeth, only the flange portions of the rivet being disclosed adjacent the sides of the teeth and insulating material;

Figure 7 is a developed view of the teeth of the connecter shown in Figures 1 to 6; and Figure 8 is a developed view of a modified tooth construction in which the teeth are provided with concave surfaces.

Referring now to the drawing more in detail wherein like numerals have been employed to designate similar parts throughout the various figures, it will be seen that my invention contemplates the provision of a connecter or terminal which I have designated generally by the numeral 10. This connecter includes a shank portion 12 having an aperture 14 adapted to receive an electrical conductor 16. The opposite extremity of the terminal is formed with an enlarged section 18 which is provided with a central aperture 20. Disposed around this aperture is a plurality of work engaging teeth 22 which teeth are separated by cut-outs or spaces 24.

Attention is particularly directed to the specific construction of the teeth 22. It will be noted that these teeth are bent so that the outer extremities are V-shaped in cross section, a V-shaped groove 26 opening to one side of the connecter stock and a blunt edge 28 oppositely disposed from said V-shaped recess. Sharp edges 30 are presented at each side of the recess 26 and are in a position, when the terminal or connecter is clamped between the work, to effectively engage said work. It will be noted particularly by reference to Figure 7 that the surfaces of the teeth which form the edges 30 meet at an acute angle, thus forming very sharp edges which effectively bite into the work. Alternate teeth are bent in one direction and the other alternate teeth are bent in the opposite direction so that either side of the connecter may be applied to the work.

Referring to Figures 1, 4, 5 and 6, it will be seen that the connecter is particularly adaptable for use with insulating sheet material 32 which is of an impressionable nature, as for example fiber or other material of like nature. In securing the connecter in position upon the insulating material 32, a suitable rivet or fastener 34 is first inserted within the connecter aperture 20 and an aperture 36 provided in the material 32. An annular flange 38 of the rivet is brought to bear against the teeth 22 and a flange 40 is clamped against the outer surface of the insulating material 32. The clamping action of the rivet is such as to cause the sharp edges 30 as well as the blunt edges 28 facing the material 32 to be forced into the impressionable surface. The material 32, in response to the pressure exerted by the rivet, is also caused to flow or be forced into the V-shaped recesses 26 and it will thus be apparent that the terminal or connecter 10 is firmly secured in position. Obviously the structural characteristics of the insulating material as well as the structural characteristics of the connecter stock will determine the degree to which the teeth and impressionable material interlock.

In Figure 8 I have shown a tooth development of modified construction. In this figure teeth 22*a* are shown which are provided with concavities or recessed areas 26*a* on both sides thereof. Relatively sharp edges 30*a* are presented at each extremity of the concavities. These teeth 22*a* are adapted to be positively clamped in position adjacent impressionable material such as the material 32 in the manner described in connection with Figures 4 to 6 inclusive. In clamping the teeth 22*a* against the impressionable material, the sharp edges or corners 30*a* are forced into the material and said material is caused to flow into the concavities 26*a*. In this manner the connecter is firmly secured against displacement.

From the foregoing description it will be apparent that my invention contemplates the provision of a connecter which may be constructed of any suitable conductive material and this material need not have the same rigid characteristics of the sheet bronze which has heretofore been employed in the manufacture of lock washers and other devices of like nature which are used to secure metallic parts such as bolts, screws, nuts and the like against loosening. Bronze is comparatively expensive and possesses inherent characteristics which make it particularly adaptable for use in instances where teeth or prongs are to be used for digging into metallic surfaces. My invention, as well as the invention set forth in the above mentioned application, is concerned with the problems of providing a relatively cheap and efficiently operable terminal member which may be secured in position upon impressionable material.

From the foregoing description it should be clear that the tooth construction is such as to greatly enhance the locking effectiveness of the connecter. This increase in locking effectiveness results from the fact that when pressure is applied to the parts as for example through the agency of the rivet 34, the sharp edges and recesses of the connecter teeth as well as the cutouts or recesses between the teeth cooperate with the impressionable or flowable material so as to positively secure said connecter in place. After said connecter has once been secured in position, the same may be subjected to considerable handling and use without the slighest tendency for said connecter to loosen. By having the connecter teeth disposed in opposite directions as shown in the drawing, either side of said connecter may be applied to the impressionable surface.

Obviously, the prongs may be U-shaped in cross section as well as V-shaped. The sharp edges presented at each side of the recesses sink into the fiber when riveted in position so that not only the recess of the tooth but also the spaces between said teeth will receive the impressionable material clamped thereagainst. The sharp edges of the prongs bearing against the rivet head also insure the desired electrical contact. In instances where the teeth are pressed against a comparatively hard material which does not readily yield to the tooth edges, these teeth will have a tendency to straighten as a result of the applied pressure after the sharp edges have been partly imbedded in the material. Obviously, this would set up an action which would tend to spread the sharp edges and consequently cut the material such as fiber in such a manner as to cause the fiber to be forced into the spaces between adjacent teeth. In other words, the specific arrangement of the connector teeth is such as to effectively employ not only the concavities or V-shaped recesses within the prongs or teeth themselves for receiving the impressionable material, but also the spaces between the adjacent teeth.

In the drawing I have disclosed the prongs as being arranged in spaced relation. However, it should be understood clearly that the invention is limited in no sense to such a spaced relation, but contemplates the provision of adjacently positioned prongs in instances where such a construction is most desirable. By eliminating the spaces or by making said spaces relatively small, obviously the number of teeth may be increased.

Having thus described my invention, what I claim as new and desire to secure by Letters Patent is:

1. A terminal of flat spring stock having an aperture therein for receiving a terminal post, a body portion, and a plurality of marginal prongs extending from and formed integral with said body portion, each prong having a pair of work engaging edges positioned out of the plane of the body portion, the edges of some of the prongs being positioned on one side of the body and the edges of the other prongs on the opposite side of the body, a space being provided between said edges for receiving impressionable material when the prongs are clamped thereagainst, said edges lying in planes spaced from and substantially parallel with the plane of the body when said prongs are clamped against the work.

2. In combination with a sheet of impressionable material, an apertured terminal member of flat spring stock, said member having a plurality of resilient teeth annularly disposed about said aperture, and a cylindrical clamping member extending through said aperture and said impressionable material, said clamping member having an annular flange which clampingly engages the impressionable material and another annular flange which clampingly engages said resilient teeth, one of said flanges having a diameter not greater than the diameter of the circle determined by the roots of said annularly disposed teeth, recesses being provided on opposite sides of the spring stock within said teeth to facilitate the locking engagement of said teeth with the impressionable material.

3. A terminal of flat spring stock having a body portion apertured to receive a member such as the body of a fastener, and a plurality of marginal prongs extending from and formed integral with said body portion, each prong being warped to present a pair of work engaging edges positioned out of the plane of the body portion, the edges of some of the prongs being positioned on one side of the body and the edges of the other prongs on the opposite side of the body, a space being provided between said edges for receiving impressionable material of the work when the prongs are clamped thereagainst, said edges lying in planes spaced from and substantially parallel with the plane of the body when said prongs are clamped against the work.

4. A terminal of flat spring stock having a body portion apertured to receive a member such as the body of a fastener, and a plurality of marginal prongs extending from and formed integral with said body portion, said prongs being of trough-shaped cross section transversely thereof and one of said prongs being reversely bent with respect to the other to provide work-engaging edges positioned on opposite sides of the body portion, the space between said edges being adapted to receive the impressionable material of the work when the prongs are clamped thereagainst, the work engaging portions of said edges lying in planes spaced from and substantially parallel with the plane of said body portion when said prongs are clamped against the work.

5. A terminal of flat spring stock having a body portion apertured to receive a member such as the body of a fastener, and a plurality of marginal prongs extending from and formed integral with said body portion, each prong being warped to present a pair of acute work engaging edges positioned out of the plane of the body portion, the edges of some of the prongs being positioned on one side of the body and the edges of the other prongs on the opposite side of the body, a space being provided between said edges for receiving impressionable material of the work when the prongs are clamped thereagainst, said edges lying in planes spaced from and substantially parallel with the plane of the body when said prongs are clamped against the work.

6. A terminal of flat spring stock having a body portion apertured to receive a member such as the body of a fastener, and a plurality of marginal prongs extending from and formed integral with said body portion, each prong provided with a pair of edges having work engaging portions positioned out of the plane of the body portion, the edges of some of the prongs being positioned on one side of the body and the edges of the other prongs on the opposite side of the body, said edges extending from the root to the free extremity of each prong, the work engaging portion of each of said edges lying in a plane spaced from and substantially parallel with the plane of the body when said prongs are clamped against the work, the space presented between said edges being adapted to receive the impressionable material of the work when said prongs are clamped thereagainst.

7. A terminal of flat spring stock having a body portion apertured to receive a member such as the body of a fastener, and a plurality of marginal prongs extending from and formed integral with said body portion, each prong provided with a pair of edges extending at a slight angle from the plane of the body portion to present a plurality of edges, the work engaging portions of which lie in planes spaced from and substantially parallel with the plane of the body when the prongs are clamped against the work, the edges of some of the prongs being positioned on one side of the body and the edges of the other prongs on the opposite side of the body, the space presented between said edges being adapted to receive impressionable material of the work when the prongs are clamped thereagainst.

8. A terminal of flat spring stock having a body portion apertured to receive a member such as the body of a fastener, and a plurality of marginal radially-disposed prongs extending from and formed integral with said body portion, the radial margins of some of the prongs being bent in one direction so as to present a plurality of pairs of edges positioned out of the plane of the body portion on one side thereof and other of the prongs having the radial margins thereof bent in the opposite direction to present a plurality of pairs of edges positioned out of the plane of the body portion on the opposite side thereof, the space between said edges being adapted to receive impressionable material of the work when the prongs are clamped thereagainst, the work engaging portions of said edges lying in planes spaced from and substantially parallel with the plane of the body when the prongs are clamped against the work.

9. A terminal of flat spring stock having a body portion apertured to receive a member such as the body of a fastener, and a plurality of marginal prongs extending from and formed integral with said body portion, each prong having a pair of work engaging edges positioned out of the plane of the body portion, the edges of some of the prongs being positioned on one side of the body and the edges of the other prongs on the opposite side of the body, a space being provided between said edges for receiving impressionable material of the work when the prongs are clamped thereagainst, said edges lying in planes spaced from and wholly parallel with the plane of the body.

10. A terminal of flat spring stock having a body portion apertured to receive a member such as the body of a fastener, and a plurality of marginal prongs extending from and formed integral with said body portion, each prong provided with a pair of acute edges extending at a slight angle from the plane of the body portion to present a plurality of acute edges, the work engaging portions of which lie in planes spaced from and substantially parallel with the plane of the body when the prongs are clamped against the work, the edges of some of the prongs being positioned on one side of the body and the edges of the other prongs on the opposite side of the body, the space presented between said edges being adapted to receive impressionable material of the work when the prongs are clamped thereagainst.

11. A terminal of flat spring stock having a body portion apertured to receive a member such as the body of a fastener, and a plurality of marginal prongs extending from and formed integral with said body portion, each prong having a pair of acute work engaging edges positioned out of the plane of the body portion, the edges of some of the prongs being positioned on one side of the body and the edges of the other prongs on the opposite side of the body, a space being provided between said edges for receiving impressionable material of the work when the prongs are clamped thereagainst, said edges lying in planes spaced from and wholly parallel with the plane of the body.

12. A terminal of flat spring stock having an aperture therein for receiving a member such as the body of a fastener, and a plurality of marginal prongs extending from and formed integral with said body, each prong having a pair of work engaging edges positioned out of the plane of the body on one side thereof and a pair of work engaging edges positioned out of the plane of the body on the opposite side thereof, the space presented between said edges being adapted to receive impressionable material of the work when the prongs are clamped thereagainst, said edges lying in planes spaced from and substantially parallel with the plane of the body when said prongs are clamped against the work.

CARL G. OLSON.